United States Patent [19]

Mizuta

[11] Patent Number: 4,854,569
[45] Date of Patent: Aug. 8, 1989

[54] APPARATUS FOR TAKING OUT FLEXIBLE WORK

[75] Inventor: Akira Mizuta, Kanagawa, Japan

[73] Assignee: Fuji Photo Film Co., Ltd., Kanagawa, Japan

[21] Appl. No.: 154,714

[22] Filed: Feb. 11, 1988

[30] Foreign Application Priority Data

Feb. 12, 1987 [JP] Japan ................................. 62-30381

[51] Int. Cl.$^4$ ............................................. B65H 3/08
[52] U.S. Cl. ..................................... 271/98; 271/105
[58] Field of Search ................... 271/98, 90, 103, 104, 271/105, 106; 294/64.1, 64.3

[56] References Cited

U.S. PATENT DOCUMENTS

| 1,585,368 | 5/1926 | Blaine | 271/98 |
| 2,850,279 | 2/1958 | Stoothoff | 271/103 |
| 3,314,676 | 4/1967 | Fromm | 271/106 |
| 3,552,741 | 1/1971 | Staines | 271/98 |
| 4,397,457 | 8/1983 | Hincheliffe | 271/98 |
| 4,553,892 | 11/1985 | Huffman | 294/64.1 |
| 4,625,953 | 12/1986 | Hamatani | 271/98 X |

FOREIGN PATENT DOCUMENTS 230662 10/1986 Japan.
254434 11/1986 Japan ................................. 271/106

OTHER PUBLICATIONS

IBM Technical Disclosure Bulletin, vol. 23, No. 5, p. 2119, Oct. 1980, "Pickup Head for Apertured Flat Members", Haney et al.

Primary Examiner—Richard A. Schacher
Attorney, Agent, or Firm—Sughrue, Mion, Zinn, Macpeak & Seas

[57] ABSTRACT

An apparatus for taking out flexible works one by one includes an air blower which is disposed on one side of a stack of flexible works and blows air onto the side of the stack of flexible works, a suction cup which has a cylindrical concave suction surface and is adapted to suck a substantially central portion of the uppermost one of the flexible works, and a pressing member which presses the periphery of the flexible work sucked by the suction cup below the central portion.

6 Claims, 4 Drawing Sheets

F I G. 5
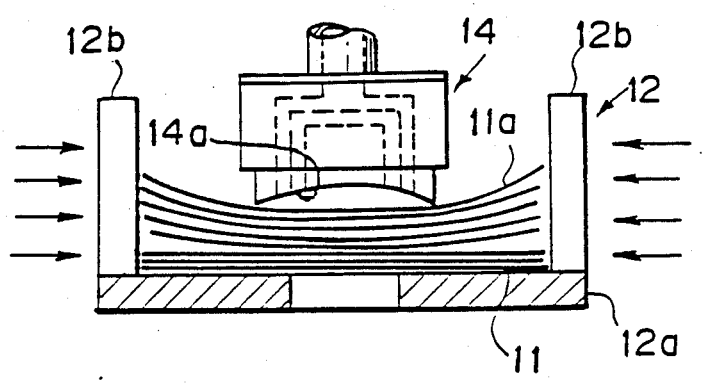
F I G. 6
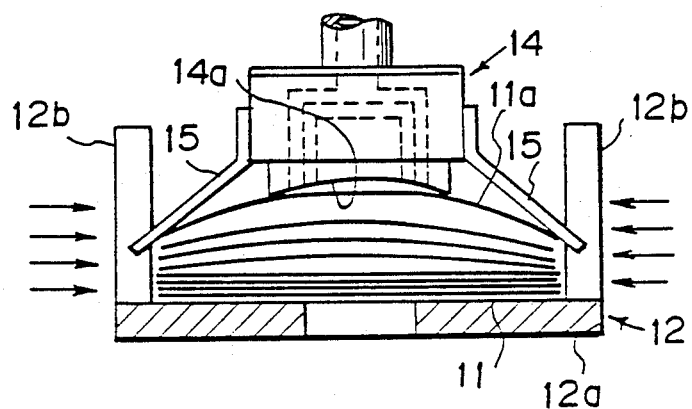

APPARATUS FOR TAKING OUT FLEXIBLE WORK

BACKGROUND OF THE INVENTION

1. Field of the Invention

This invention relates to an apparatus for taking out flexible works one by one from a stack of the same.

2. Description of the Prior Art

There has been known a method of taking out flexible works one by one from a stack of the same in a container in which upper works are separated from the rest by use of an air nozzle or the like and the upper works are further separated one by one by a baffle plate.

However, in the case of a flexible work which is very thin and has a flat and smooth surface such as a magnetic disk, air between the surfaces of the works is squeezed out under the weight of the stacked works themselves and the works adhere to each other, thereby making it difficult to surely separate the works one by one especially when the works are to be taken out at high speed. Further, in the case of magnetic disks, when the recording region is touched, the recording region can be scratched or contaminated and accordingly, the portions which may touched are limited, thereby making the difficulty more significant.

In the method disclosed in Japanese Unexamined Patent Publication No. 61(1986)-230662, as shown in FIG. 9, air blow means 3 are disposed on opposite sides of a stack of flexible works 1 in a container 2 and while air is blown onto the stack of flexible works 1, the uppermost work 1 is picked up by a pair of suction means 4. In this method, the suction means 4 are arranged so that the flexible work 1 is deflected into a cylindrical shape convex upward when sucked by the suction means 4. Though this approach can overcome the difficulties described above to some extent, it gives rise to another problem that since the pair of suction means 4 must be manipulated to lift the flexible work 1 deflecting it into a cylindrical shape, a complex control means for controlling the suction means is required, thereby adding to the overall size and the manufacturing cost of the apparatus and complicating structure of the same.

SUMMARY OF THE INVENTION

In view of the foregoing observations and description, the primary object of the present invention is to provide an apparatus for taking out flexible works one by one from a stack of the flexible works which can surely separate the works one by one at high speed without possibility of scratching or contaminating the working surface of the flexible work, and which is simple in structure and can be manufactured at low cost.

The apparatus in accordance with the present invention comprises an air blow means which is disposed on one side of a stack of flexible works and blows air onto the side of the stack of flexible works, a suction means which has a cylindrical concave suction surface and is adapted to suck a substantially central portion of the uppermost one of the flexible works, and a pressing means which presses the periphery of the flexible work sucked by the suction means below the central portion.

In accordance with the present invention, by blowing air onto the side of the stack of the flexible works, the works are floated and separated from each other. Each work is picked up by the suction means with the work being deflected into a cylindrical shape by virtue of the shape of the suction surface and the pressing means. By deflecting the works into a cylindrical shape where they adhere to each other, the peripheral edge of the lower work is caused to project outwardly beyond the peripheral edge of the upper work, and air blow by the air blow means below the projecting portion of the lower work to reliably separate the lower work from the upper work.

The apparatus of the present invention touches the work only at the central portion and the periphery thereof, and accordingly, in the case of magnetic disks having a donut like recording region, the recording region is almost totally safe from being scratched or contaminated.

Further, the suction means and the pressing means need only be moved up and down with respect to the works and a complex control means is not necessary.

BRIEF DESCRIPTION OF THE DRAWINGS

FIGS. 5 and 6 are views for illustrating the operation of the pressing means, FIG. 5 showing the state without the pressing means.

DESCRIPTION OF THE PREFERRED EMBODIMENT

Figure 1:
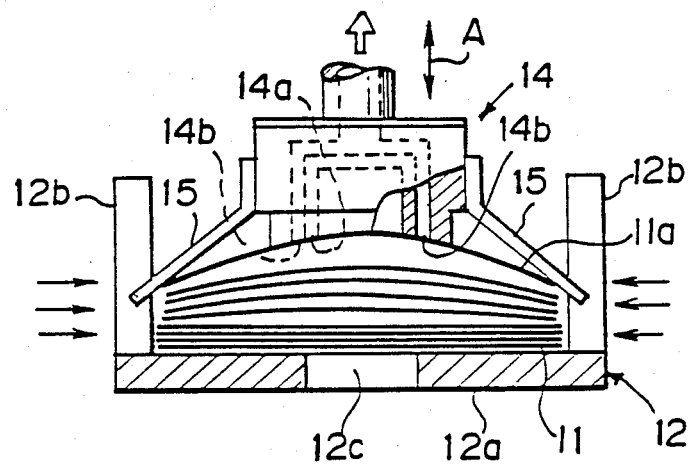
FIG. 1 is a cross-sectional view (taken along line I—I in FIG. 3) showing an apparatus in accordance with an embodiment of the present invention.
Figure 2:
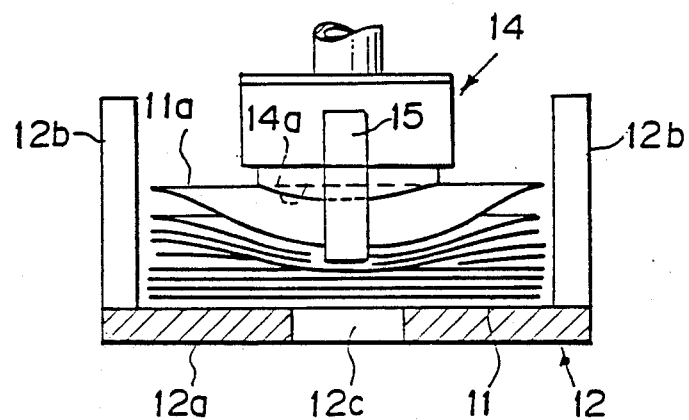
FIG. 2 is a cross-sectional view taken along line II—II in FIG. 3.

In FIG. 1, a plurality of flexible works 11 (magnetic disks in this particular embodiment) are stacked in a container 12. The container 12 comprises a circular base plate 12a and four vertical walls 12b projecting upward from the base plate 12a spaced from each other as clearly shown in FIG. 3. The base plate 12 is provided with a central opening 12c which is aligned with central openings of the works 11.

Figure 3:
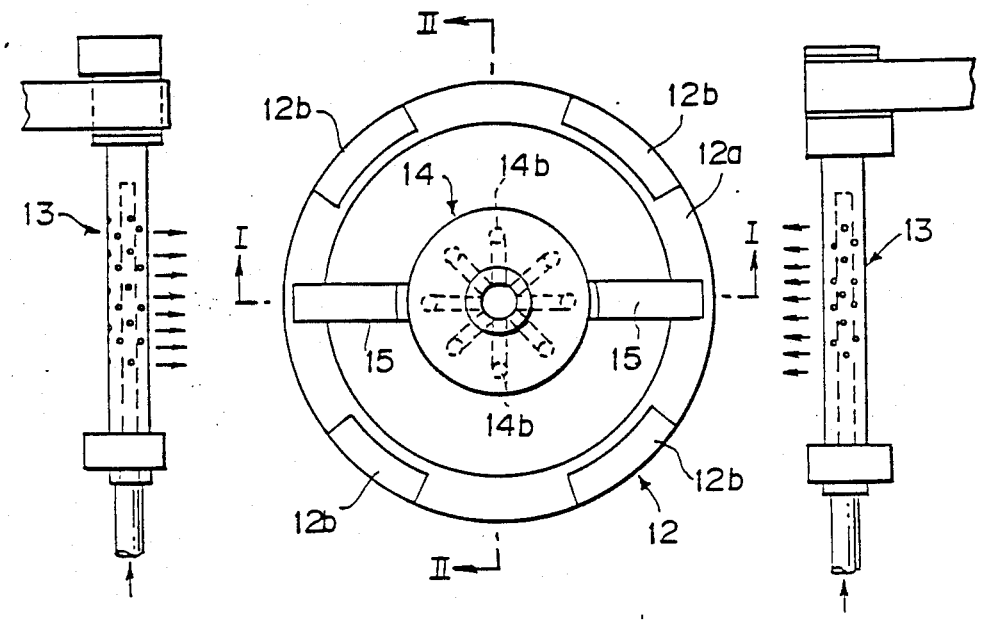
FIG. 3 is a plan view of the apparatus.
Figure 4:
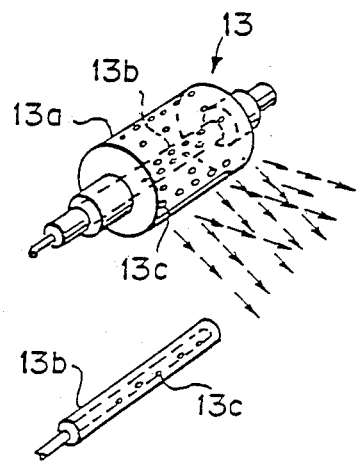
FIG. 4 is a perspective view showing the air blow means employed in the apparatus.

A pair of air blowers 13 are respectively provided on the right and left sides of the container 12 at positions aligned with the spaces between the vertical walls 12b. The air blowers 13 are for blowing air between the works 11 from the sides thereof. In this particular embodiment, each air blower 13 comprises a stationary nozzle 13b and a rotating nozzle 13a which is fitted on the stationary nozzle 13b to rotate about the stationary nozzle 13b. The rotating nozzle 13a is provided with a plurality of air outlets discontinuous in the rotating direction thereof. The stationary nozzle 13b has a plurality of air outlets 13c at least some of which are constantly communicated with the rotating nozzle 13a so that air is intermittently blown from the blower 13 and the amount of air blown from the blower 13 varies as the rotating nozzle 13a rotates about the stationary nozzle 13b. The apparatus may be provided with only a single air blower 13 or may be provided with additional air blowers. For example, an additional pair of blowers 13 may be provided diametrically opposed to each other on the upper and lower sides as seen in FIG. 3.

The uppermost work 11a in the stack of the works 11 is separated from the other works and taken out by a suction means 14 and a pressing member 15 integrally provided with the suction means 14. As clearly shown in FIG. 5, the suction means 14 has a cylindrical concave suction surface 14a which is concave upward. The suction means 14 is positioned to be opposed to the central portion of the uppermost work 11a and is movable up and down with respect to the stack of the works 11 as shown by arrow A. Eight suction holes 14b which are arranged on one circle and communicated with a vacuum source (not shown) open in the suction surface 14a as clearly shown in FIG. 3.

Generally, when air is blown onto a stack of flexible works accommodated in a container from a side of the stack, the peripheral edge of each work tends to be lifted above the central portion and to be deflected into a cylindrical shape convex downward as shown in FIG. 5. When the work 11 is deflected into such a shape, it becomes difficult for the suction means 14 having a cylindrical concave suction surface to suck the work 11. In order to prevent the work 11 from deflecting into a cylindrical shape convex downward, a pair of pressing members 15 are mounted on the suction means 14 to extend below the suction means 14 at the sides on which the air blowers 13 are disposed. The pressing members 15 are brought into contact with the periphery of the uppermost work 11a before the suction surface 14a is brought into contact with the same when the suction means 14 is moved downward, thereby pressing down the periphery of the uppermost work 11a to deflect the uppermost work 11a into a cylindrical shape convex upward. That is, the pressing members 15 serve both to prevent the periphery of the uppermost work 11a from being bent upward by air blown from the air blower 13 and to assist the uppermost work 11a to be deflected into a shape conforming to the shape of the suction surface 14a, thereby ensuring that the uppermost work 11a is sucked by the suction means 14. The suction means 14 may alternatively be provided with only a single pressing member 15 or with three or more pressing members 15.

After the uppermost work 11a is sucked by the suction means 14, the suction means 14 together with the pressing members 15 is lifted to take out the uppermost work 11a.

Normally, the works 11 in the stack are separated by virtue of air blown from the air blower 13, but the second uppermost work can sometimes adhere to the uppermost work 11a. In such a case, the periphery of the second uppermost work projects outwardly beyond the peripheral edge of the uppermost work 11a due to the difference in the radius of curvature therebetween, and air is blown on the peripheral edge portion of the second uppermost work projecting outside the peripheral edge of the uppermost work 11a to separate the second uppermost work from the uppermost work 11a.

Figure 7:
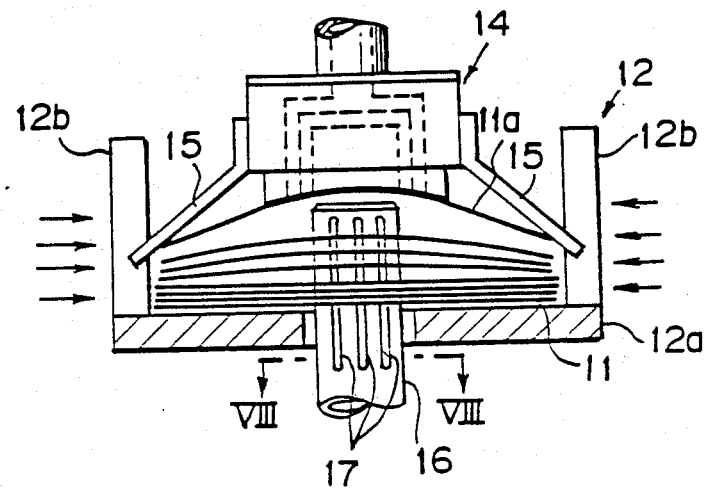
FIG. 7 is a cross-sectional view showing another embodiment of the present invention.
Figure 8:
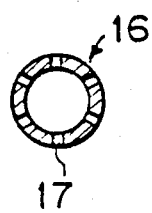
FIG. 8 is a cross-sectional view taken along line VIII—VIII in FIG. 7.
Figure 9:
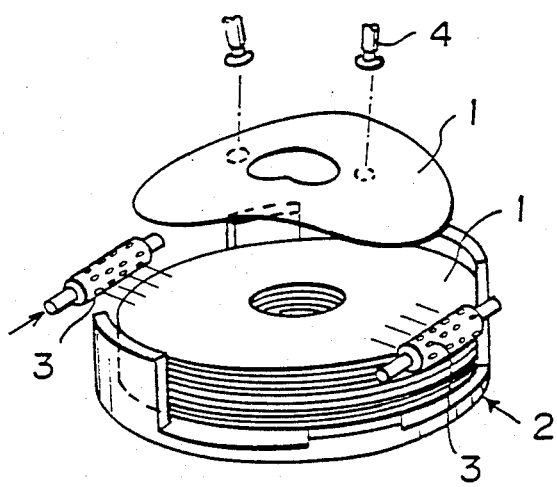
FIG. 9 is a perspective view showing an apparatus for taking out flexible works one by one in accordance with a prior art.

As the number of the works 11 in the container is reduced, the behavior of the works 11 becomes unstable and the works 11 may escape from the container 12. Accordingly, it is preferred that a work retainer member 16 be provided to extend through the central openings of the works 11 as shown in FIG. 7. In this particular embodiment, the work retainer member 16 is in the form of a hollow rod provided with six slits 17 which permits air flow through the work retainer member 16 as clearly shown in FIG. 8. The slits 17 serve to stabilize air flow in the container 12. This arrangement is advantageous over an arrangement in which the work retainer member is simply a rod since if the work retainer member is not provided with such slits, air flow at the peripheral portion of the works 11 can be prevented, which would adversely affect separation of the works and/or sucking of the uppermost work 11a by the suction means 14.

I claim:

1. An apparatus for taking out flexible works one by one from a stack of the same comprising:
    an air blow means which is disposed on at least one side of the stack of flexible works and blows air onto the side of the stack of flexible works;
    a suction means which has a cylindrical concave suction surface and is adapted to such a substantially central portion of the uppermost one of the flexible works, and
    a pressing means, which extends below the suction surface of the suction means so as to contact the uppermost flexible work before the suction surface, presses the periphery of the uppermost flexible work below the central portion thereof when the uppermost flexible work is sucked by the suction means.

2. An apparatus as defined in claim 1 in which said air blow means is arranged to intermittently blow air in fluctuating amounts.

3. An apparatus as defined in claim 1 in which said flexible works are respectively provided with central openings and said apparatus further comprising a work retainer member which extends through the central openings and is provided with slits permitting air flow through the work retainer member.

4. An apparatus as defined in claim 1 in which a pair of air blow means are provided on opposite sides of the stack of the works.

5. An apparatus as defined in claim 1 in which said pressing means comprises a pressing member which is fixed to the suction means to be moved together with the suction means and extends downwardly and radially outwardly at an angle with respect to the suction means to a position below the suction surface of the suction means to be brought into contact with the uppermost work before the suction surface when the suction means is moved toward the uppermost work, the pressing member being fixed to the suction member on the side of the suction means opposed to said air blow means.

6. An apparatus as defined in claim 1 in which said air blow means comprises a stationary nozzle and a rotating nozzle disposed on said stationary nozzle to rotate thereon wherein each nozzle is provided with a plurality of air outlets which communicate with one another so that air is intermittently blown from the air blow means as the rotating nozzle rotates about the stationary nozzle.

* * * * *